US008651253B2

(12) United States Patent
Herper et al.

(10) Patent No.: US 8,651,253 B2
(45) Date of Patent: Feb. 18, 2014

(54) DAMPING DEVICE WITH MULTISTAGE VARIABLE DAMPING CHARACTERISTICS, PARTICULARLY FOR DAMPING MOVEABLE FURNITURE PARTS

(75) Inventors: Markus Herper, Muehltal (DE); Gabriele Schneider, Fraenkisch-Crumbach (DE)

(73) Assignee: Grass GmbH & Co. KG, Reinheim (DE)

( * ) Notice: Subject to any disclaimer, the term of this patent is extended or adjusted under 35 U.S.C. 154(b) by 155 days.

(21) Appl. No.: 12/740,219

(22) PCT Filed: Dec. 20, 2008

(86) PCT No.: PCT/EP2008/011166
§ 371 (c)(1),
(2), (4) Date: Apr. 28, 2010

(87) PCT Pub. No.: WO2009/086922
PCT Pub. Date: Jul. 16, 2009

(65) Prior Publication Data
US 2010/0270114 A1 Oct. 28, 2010

(30) Foreign Application Priority Data

Jan. 11, 2008 (DE) ............... 20 2008 000 455 U

(51) Int. Cl.
*F16F 9/48* (2006.01)
(52) U.S. Cl.
USPC ............... 188/285; 188/319.2; 188/282.1; 188/322.15
(58) Field of Classification Search
USPC .......... 188/283, 285, 322.22, 322.13, 322.15, 188/289, 312, 319.1, 319.2, 282.1
See application file for complete search history.

(56) References Cited

U.S. PATENT DOCUMENTS

| 1,586,901 | A | * | 6/1926 | De Witt Hubbell | 16/82 |
|---|---|---|---|---|---|
| 1,658,962 | A | * | 2/1928 | Aikens | 188/287 |
| 3,827,538 | A | * | 8/1974 | Morgan | 188/319.1 |
| 3,937,307 | A | * | 2/1976 | de Kock | 188/319.2 |
| 4,057,264 | A | * | 11/1977 | Suzuki et al. | 280/276 |
| 4,724,937 | A | * | 2/1988 | Fannin et al. | 188/282.5 |
| 4,800,995 | A | * | 1/1989 | Bernhardt et al. | 188/266.4 |
| 4,867,286 | A | * | 9/1989 | Taylor | 188/282.5 |
| 5,150,916 | A | * | 9/1992 | Petrofes et al. | 188/266.4 |
| 5,341,905 | A | | 8/1994 | Lu | |
| 8,434,600 | B2 | * | 5/2013 | Herper et al. | 188/285 |
| 2010/0025173 | A1 | * | 2/2010 | Herper et al. | 188/316 |

FOREIGN PATENT DOCUMENTS

| DE | 4408292 A1 | 9/1994 | |
|---|---|---|---|
| DE | 10300732 A1 | 7/2004 | |
| JP | 06129470 A * | 5/1994 | ............... F16F 9/44 |
| JP | 10205570 A | 8/1998 | |

* cited by examiner

*Primary Examiner* — Thomas Irvin
(74) *Attorney, Agent, or Firm* — Norris McLaughlin & Marcus, P.A.

(57) ABSTRACT

Damping device for moveable furniture parts. A longitudinally displaceable piston on opposing sides forms two variable size working chambers filled with a damping medium via at least one overflow connection. A piston rod led out of the housing is connected to one side of the piston. An adjustment shaft is connected to one side of the piston opposite one of the working chambers, its free end is also led out of the housing. A throttle disc radially protrudes from the circumferential surface of the adjustment shaft. The throttle disc being disposed in a region of an end of a piston passage bore connecting the two working chambers and configuring the overflow connection abutting a front surface of the piston. Recesses in the throttle disc offset from each other circumferentially have different cross-sections. The recesses may be selectively aligned by rotating the adjustment shaft relative to the passage bore.

18 Claims, 4 Drawing Sheets

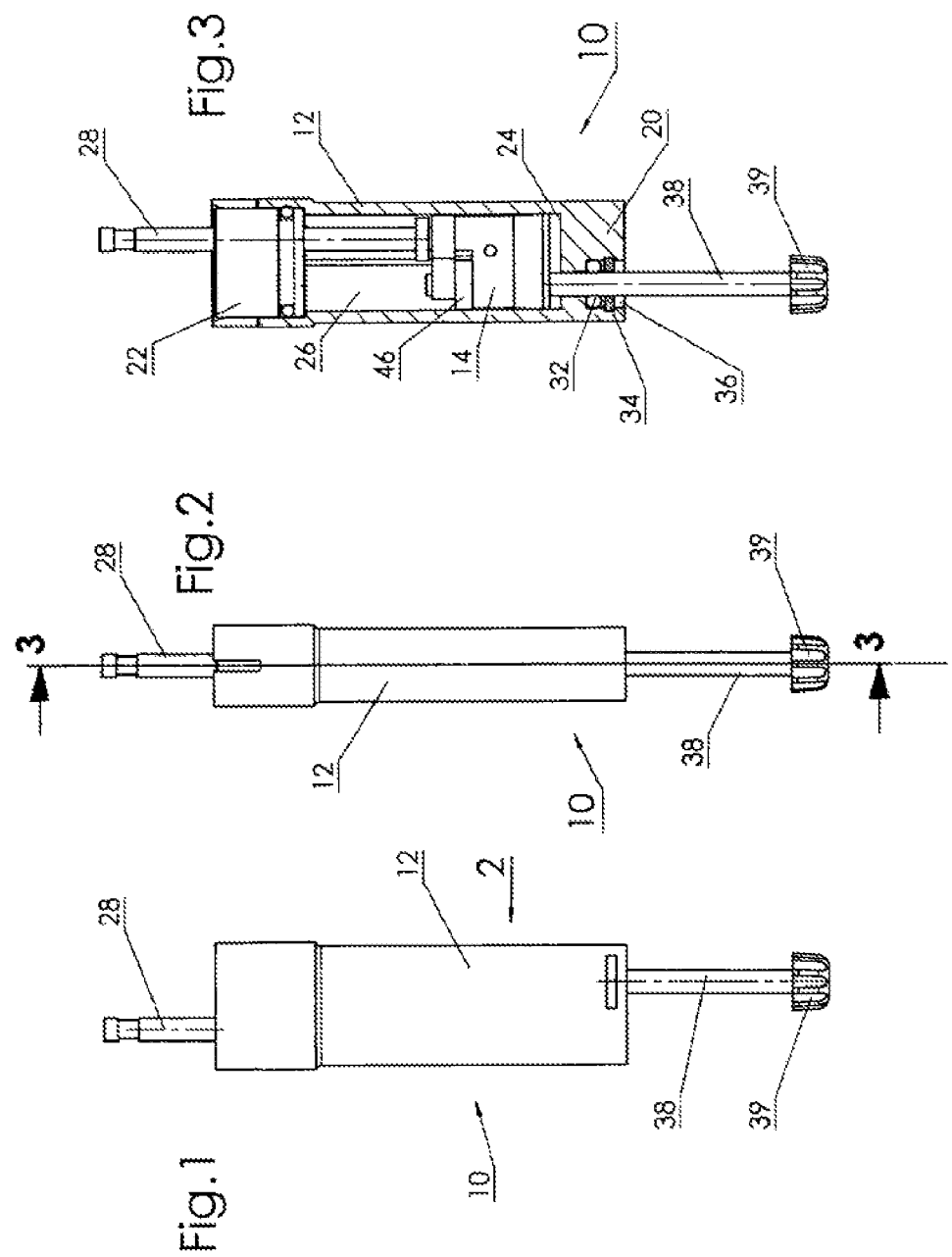

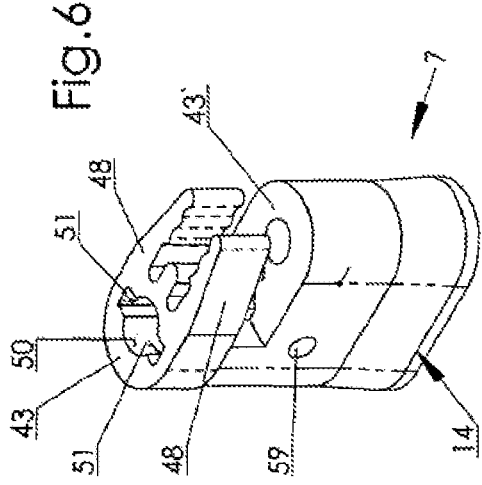
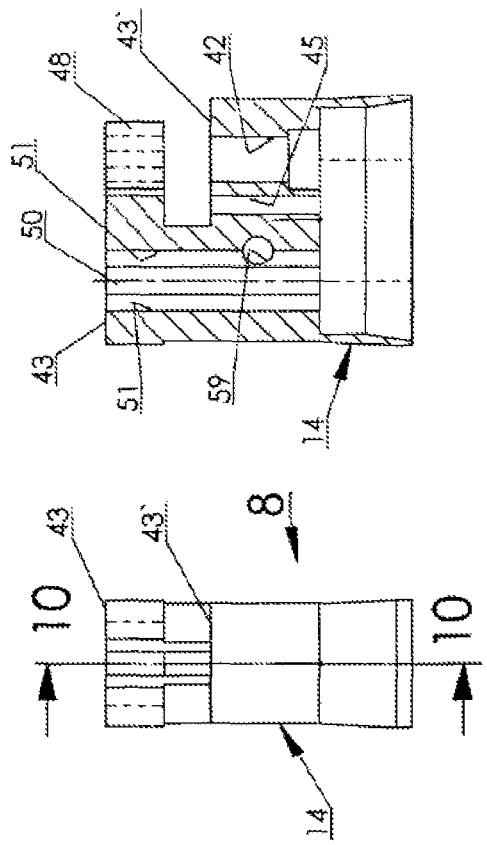
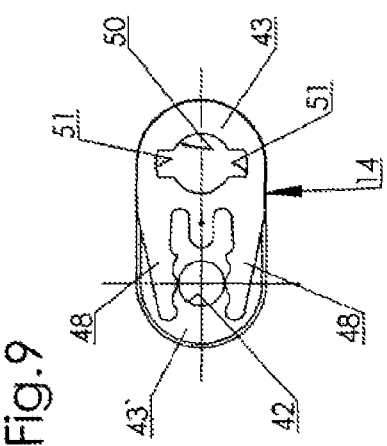
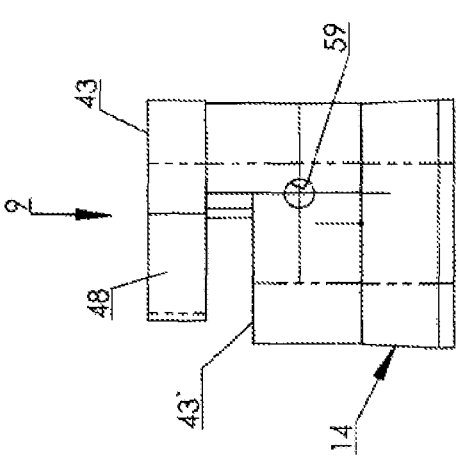

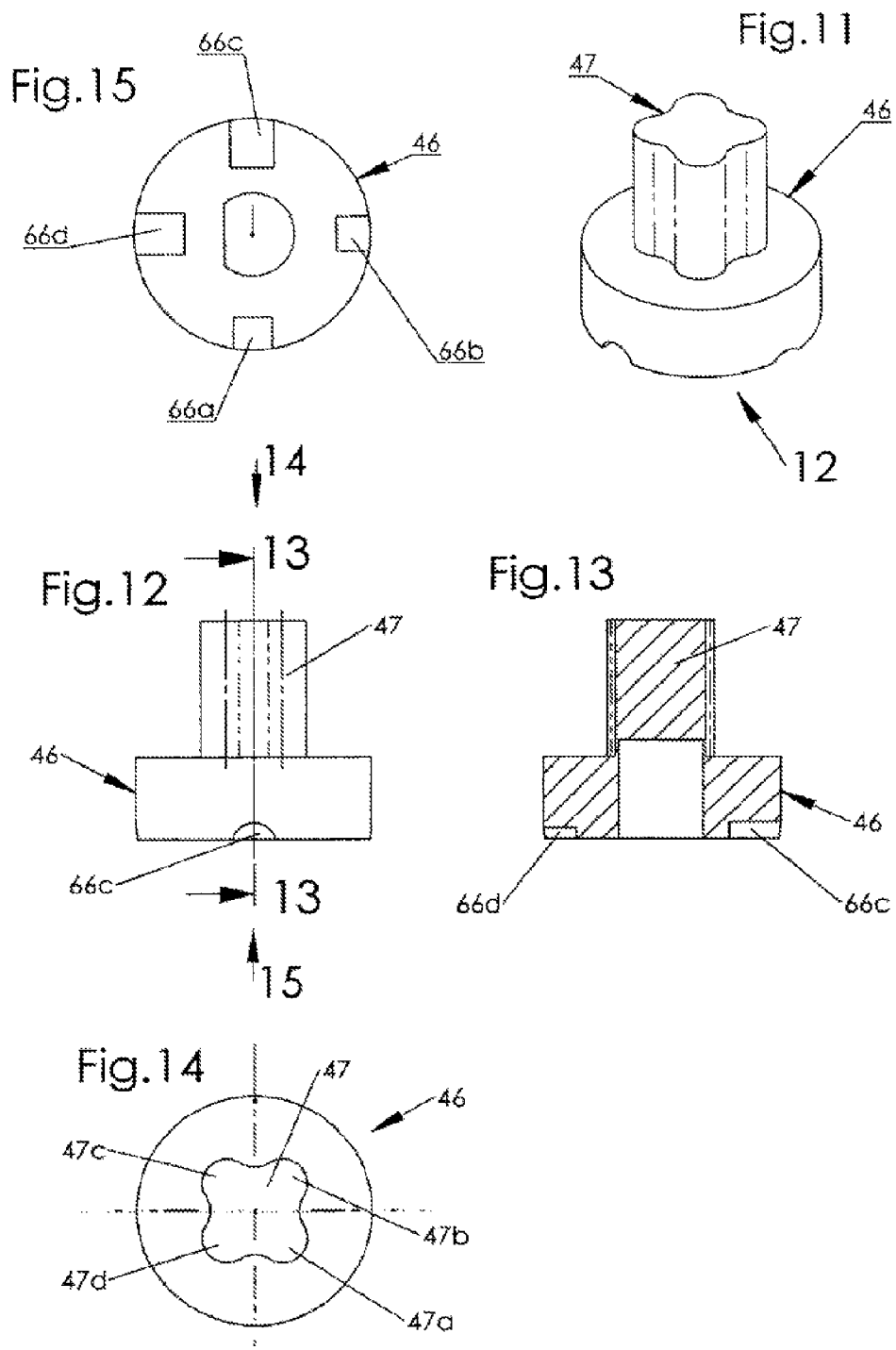

DAMPING DEVICE WITH MULTISTAGE VARIABLE DAMPING CHARACTERISTICS, PARTICULARLY FOR DAMPING MOVEABLE FURNITURE PARTS

BACKGROUND OF THE INVENTION (1) Field of the Invention

This application is a 371 application of PCT/EP2008/011166 filed Dec. 20, 2008, which claims priority to the German application 20 2008 000 455.1 filed Jan. 11, 2008.

The invention relates to a damping device, in particular for damping the movement of movable furniture parts of pieces of furniture, with a piston which is mounted so as to be longitudinally displaceable in a housing and which as a function of its displaced position forms working chambers filled with a fluid damping medium on opposing sides of two working chambers of variable size filled with a fluid damping medium, which by way of at least one overflow connection enables a throttled overflow of the damping medium between the two working chambers, wherein a piston rod which is led in a sealed manner out of the associated front end of the housing is connected on one side of the piston, the movement of the furniture part to be damped being transmitted to the outer end of the piston rod remote from the piston, wherein an elongate adjustment shaft with a diameter corresponding substantially to the diameter of the piston rod is connected on the side of the piston opposite the working chamber on the piston rod side, and the free end of the adjustment shaft is likewise led in a sealed manner out of the end face of the housing lying opposite the closed end face on the piston rod side, wherein the adjustment shaft is disposed rotatably in the piston and has a throttle disc projecting radially from the circumferential surface thereof which in the region of one end of a piston passage bore which connects the two working chambers and forms the overflow connection abuts an end face of the piston, and the throttle disc is provided with a plurality of recesses with different passage cross-sections which are offset from one another in the circumferential direction and can be aligned selectively by rotation of the adjustment shaft with the passage bore which is provided in the piston and connects the working chambers.

(2) Description of Related Art

In furniture construction such damping or also decelerating devices serve for example to avoid or at least largely reduce the stresses and noise produced during rapid vigorous closing of doors or closing of drawers of cabinets during the jerky deceleration of the movable furniture part mounted on the carcass. Damping devices operating with viscous fluids, such as for example silicone oil, as damping medium (e.g. DE 103 00 732 A1) have the advantage over devices operating with gaseous damping medium that these fluid damping media are practically incompressible, so that they have no resilient properties, which seeks to move the movable furniture part back somewhat out of the actual closed position after the closed position is reached. When such dampers are used the problem arises that the damping forces to be generated for damping of the movable furniture part are also dependent upon the mass of the respective furniture part and the closing speed thereof, so that for different damping tasks different dampers are necessary which are appropriately adapted to the required damping characteristics.

In order to construct these known damping devices so that they are adjustable to different damping characteristics without conversion or replacement of individual parts, damping devices have been proposed (PCT/EP2007/008461, FIGS. 14 to 21) which are constructed in the manner described in the introduction and in which the damping characteristics are variable in a predetermined number of stages, e.g. in four stages, in that by rotation of the adjustment shaft and thus of the throttle disc a respective one of a plurality of recesses with different passage cross-sections in the throttle disc can be aligned with the passage bore in the piston which connects the working chambers. In this damping device—which was not prior-published—the throttle disc in the respective selected damping stage is against inadvertent rotation by a positive locking engagement. In this case in order to change over to another damping stage it is necessary first of all to interrupt this locking against rotation, which is possible by longitudinal displacement of the adjustment shaft against the initial tension of a tension spring. In this longitudinally displaced state the adjustment shaft can then be rotated into the desired damping stage. It can be seen that this design does indeed achieve a high degree of security against inadvertent alterations to a set damping characteristic but that the adjustment operation itself is complex and a correspondingly increased outlay on construction is necessary because of the requirement for exertion of a pretension and the displaceable mounting of the adjustment shaft.

BRIEF SUMMARY OF THE INVENTION

By contrast, the object of the invention is to make further developments to the known damping device so that without increasing the complexity of construction and reducing the security against inadvertent adjustment of the damping characteristic it enables a multistage alteration of the damping characteristic only by rotation of the adjustment shaft.

Starting from a damping device of the type referred to the introduction, this object is achieved according to the invention in that the throttle disc, which has a substantially circular boundary when viewed from above and at least in the radially outer edge region has two planar end faces extending parallel to one another, is retained rotatably on or in the piston and secured against longitudinal displacement in the direction of the longitudinal central axis of the adjustment shaft, and that retaining devices are provided which secure the throttle disc against inadvertent rotation in the respective alignment positions of the recesses with the passage bore in the piston.

In a preferred alternative embodiment of the invention the configuration is such that the throttle disc has a bearing lug projecting from its side remote from the working chamber of the piston through which the adjustment shaft passes, the bearing lug being rotatably retained between two spring arms provided on the piston and resiliently pressed against the circumference thereof.

In this case the embodiment is such that the bearing lug has a cross-section which deviates from the circular cross-section and is provided with rounded projections and recesses which alternate in succession in the circumferential direction, and that the spring arms are then each provided with contact regions shaped so as to be complementary to the circumferential surface of the bearing lug. Then for rotation of the adjustment shaft not only must the friction prevailing between the spring arms and the bearing lug be overcome but also when the adjustment shaft is rotated the spring arms must be deflected with additional increase of the spring pretension until after a maximum deflection is overcome they spring back into the position assigned to the next stage of the damping characteristic.

In this case the throttle disc and the bearing lug can be constructed as an integral component, wherein the end of the adjustment shaft on the piston rod side is non-rotatably connected to the throttle disc.

The bearing lug can also be formed by the end of the adjustment shaft which is located on the piston rod side and passes non-rotatably through the throttle disc, wherein the retaining devices which secure the throttle disc against unwanted rotation in a selected alignment position are then advantageously formed by the provision of complementary latching projections or latching recesses offset with respect to one another in the circumferential direction on the surface of the throttle disc facing the spring arm and the boundary surface of the spring arms facing the throttle disc, the number of latching projections or latching recesses and the arrangement thereof in relation to the recesses of the throttle disc being selected such that when at least one latching projection engages in the associated latching recess in each case at least one of the recesses formed in the end face of the throttle disc facing the end face of the piston is aligned with the passage bore in the piston which connects the working chambers.

In order to optimise the piston stroke it is advisable for the contact region of the throttle disc on the end face of the piston remote from the adjustment shaft to be set back, in a stepped manner relative to the rest of the end face of the piston on the piston rod side in the direction of the working chamber through which the adjustment shaft passes, by such an amount that the boundary surfaces of the spring arms remote from the throttle disc which are pressed resiliently on the bearing lug do not project over the end face of the piston on the piston rod side.

In this case the spring arms are preferably attached to the piston with a spacing corresponding substantially to the thickness of the throttle disc parallel to the contact region of the throttle disc on the piston end surface, and in fact in this case the spring arms are an integral part of the piston.

A handle which is constructed for example as a rotary knob enlarged in diameter relative to the shaft diameter of the adjustment shaft, the circumferential surface of the rotary knob being advantageously provided with grooves or a knurling.

In an advantageous further embodiment the housing and the piston disposed so as to be longitudinally displaceable in the interior of the housing may have a cross-section which deviates from the circular cross-sectional shape, being oval or formed by two parallel straight boundaries closed at their ends by arcs. Due to this so-called "compressed" cross-sectional shape of the housing of the damping device it is possible for the damping device also to be disposed in those regions of a piece of furniture in which there is only a small spacing between the furniture parts which movable relative to one another. As an example reference is made to the spacing between the outer face of a drawer wall and the associated inner face of the carcase of the drawer cabinet. The external dimensions of the damping device can be optimised in an advantageous manner in that the piston rod is offset in terms of its longitudinal central axis laterally with respect to the longitudinal central axis of the adjustment shaft and retained in a passage opening in the piston, and in the region of the passage opening in the piston through which the piston rod passes an overflow passage is constructed, wherein in the working chamber of the piston rod on the piston rod end a valve collar is displaceably retained between a position in which it rests on the piston end face and closes the overflow passage and a position in which it is raised from the piston end face and connects the overflow passage to the working chamber remote from the piston rod.

In this case the passage opening in the piston preferably has a circular cross-section which corresponds substantially to the diameter of the piston rod and has in a part-region at least one radial increase in diameter which in each case forms a continuous recessed groove forming an overflow passage in the passage opening.

In this case the valve collar is advantageously constructed as an integral part of the piston rod.

BRIEF DESCRIPTION OF THE SEVERAL VIEWS OF THE DRAWING(S)

The invention is explained in greater detail in the following description of an embodiment in conjunction with the drawings, in which:

FIG. 1 shows a side view of a first embodiment of a damping device according to the invention, wherein the piston rod is shown in the position in which it is completely inserted into the housing;

FIG. 2 shows a front view of the damping device, viewed in the direction of the arrow 2 in FIG. 1;

FIG. 3 shows a sectional view through the damping device in the section plane illustrated in FIG. 2 by the arrows 3-3;

FIG. 6 shows an isometric view of the piston of the damping device without the piston rod and adjustment shaft;

FIG. 7 shows a front view of the piston, viewed in the direction of the arrow 7 in FIG. 6;

FIG. 8 shows a view of the piston, viewed in the direction of the arrow 8 in FIG. 7;

FIG. 9 shows a top view of the piston, viewed in the direction of the arrow 9 in FIG. 8;

FIG. 10 shows a sectional view through the piston in the sectional plane illustrated by the arrows 10-10 in FIG. 7;

FIG. 11 shows an isometric view of a throttle disc rotatably disposed in the piston;

FIG. 12 shows a side view of the throttle disc, viewed in the direction of the arrow 12 in FIG. 11;

FIG. 13 shows a sectional view along the arrows 13-13 in FIG. 12;

FIG. 14 shows a top view of the throttle disc, viewed in the direction of the arrow 14 in FIG. 12; and FIG. 15 shows an underneath view of the throttle disc, viewed in the direction of the arrow 15 in FIG. 12.

DETAILED DESCRIPTION OF THE INVENTION

Figure 4:
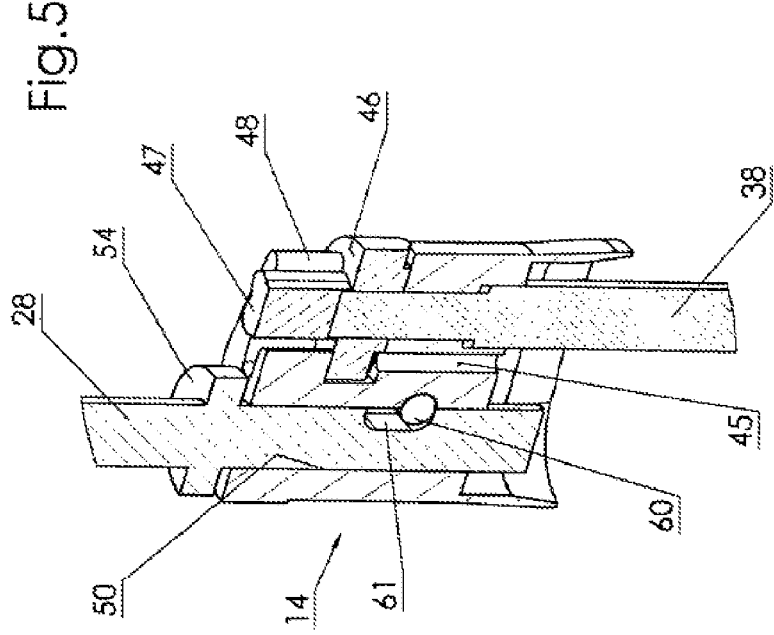
FIG. 4 shows an isometric view of the piston as well as the end regions of the piston rod and of the adjustment shaft of the damping device connected to the piston.

The embodiment of the damping device according to the invention which is shown in FIGS. 1 to 3 of the drawings and denoted overall by 10 has a housing 12 which—unlike known damping devices with a housing which is hollow and cylindrical and therefore is usually also referred to briefly as a "cylinder"—has a cross-section formed by two parallel straight boundary edges which are spaced from one another and are connected at their ends by semicircular boundary lines.

Accordingly a piston with a across-section of complementary shape to the interior of the housing is inserted displaceably in the hollow interior of the housing 12.

The housing 12 is closed on its lower end in the drawings by an integral end wall 20 and on its upper end by a separate housing cover 22 fixed in the housing 12, whereby working chambers 24, 26 respectively which are filled with fluid damping medium are produced on opposing sides of the end faces of the piston 14.

A piston rod 28, which is led in a sealed manner through the housing cover 22 and connected at its end within the housing to the piston 14, transmits to the piston 14 movements induced in the free outer end of the movable furniture part to be damped, and the piston 14 is thereby displaced in the housing 12, wherein the volume of the working chambers 24, 26 is respectively increased or decreased as a function of the direction of movement of the piston 14. FIG. 3 shows the position of the piston rod 28 in which it is inserted completely into the housing 12 and in which the piston 14 abuts the inner face of the end wall 20, and therefore the working chamber 24 disappears in the illustration. Depending upon the change in the volumes of the working chambers the damping medium enclosed in the housing must be able to overflow from the decreasing working chamber into the opposite increasing working chamber. For this, through channels are formed in the piston 14, the design of these through channels being explained in greater detail below.

The working chamber 24 lying opposite the working chamber 26 through which the piston rod 28 passes has an adjustment shaft 38 passing through it which is offset laterally from the piston rod 28 and which in turn is led through a stepped passage 30 in the housing end wall and is provided on its outer free end with a handle in the form of a rotary knob provided on its circumferential surface with grooves or a knurling. The sealing of the adjustment shaft takes place by a sealing ring 32 constructed as an O-ring which is retained in the passage by an annular disc 34 and an adjoining toothed disc 36 and forms a seal on the circumferential surface of the adjustment shaft 38. The sealing of the piston rod 28 in the housing cover 22 takes place in an analogous manner, which cannot be seen in FIG. 3 because the housing cover 22 is not shown in section.

Figure 5:
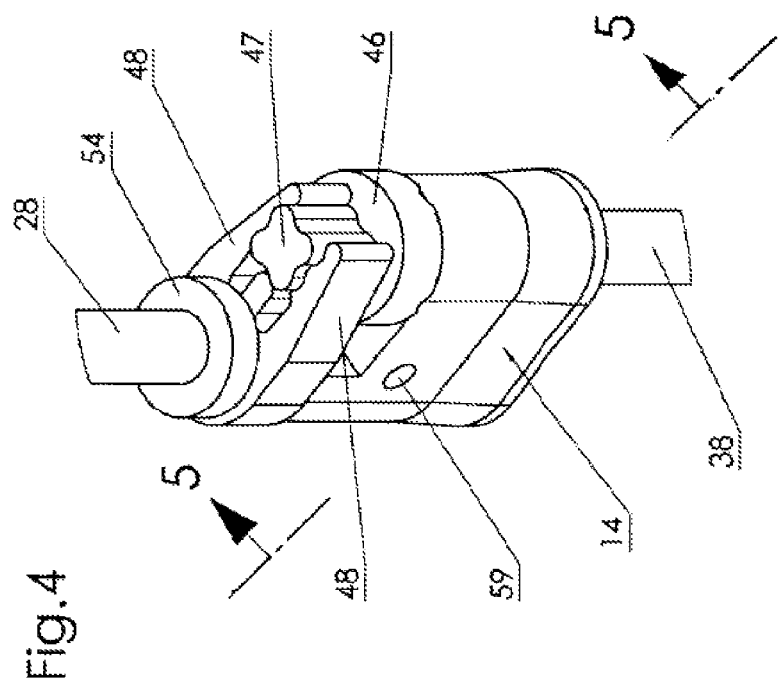
FIG. 5 shows a sectional view, viewed in the direction of the arrows 5-5 in FIG. 4.

In FIGS. 4 and 5 the piston 14 is shown with the piston rod 28 connected to it and the adjustment shaft 38, wherein the sectional representation in FIG. 5 shows that the end of the piston rod 28 on the piston side is disposed displaceably in a passage opening 50 in the piston 14 and is retained by means of a pin 60 into a transverse bore 59 in the piston 14 passing tangentially through the passage opening, In this case a limited displaceability of the piston rod 28 is achieved in that the recess 61 through which the pin 60 passes tangentially has, in the circumferential surface of the piston rod 28, a certain longitudinal extent in the longitudinal direction of the piston rod, so that within the framework predetermined by the longitudinal extent of the recess 61 the piston rod 28 can be displaced in the passage opening. The passage opening 50 in the piston is constructed so that it is only partially complementary to the diameter of the piston rod 28. In two diametrically opposing regions, the diameter of the passage opening 50 has over its entire length continuous recessed grooves 51 which therefore form overflow passages between the working chambers 26, 24. In the region of the end face 43 of the piston 14 facing the working chamber 26, the piston rod is provided with a circumferential radially projecting valve collar 54 which when it abuts the piston end faces closes off the overflow passages formed by the grooves 51, whilst in the position in which it is raised from the piston end face it allows an overflow of the damping medium between the working chambers.

The part of the adjustment shaft 38 within the housing engages, in its end region on the piston side, through a bearing bore 42 provided in the piston 14, wherein its free end is non-rotatably connected to a throttle disc 46 in the form of a circular disc which projects radially from the adjustment shaft 38. The end face of the throttle disc 46 facing the working chamber 24 is supported on a planar portion 43' which is set back in a stepped manner relative to the rest of the end face 43 and in which an additional passage bore 45 opens which is offset in the direction of the passage opening 50, passes through the piston 14 and thus forms a further connecting passage between the two working chambers. This passage bore 45 is covered by the throttle disc 46 from which a bearing lug 47 projects. This bearing lug 47 is retained rotatably between two spring arms 48 which are provided on the piston and pressed resiliently onto the circumferential surface thereof, and of which the undersides facing the end face portion 43' rest on the planar upper face of the throttle disc 46 and thus ensure that the throttle disc 46 in the mounted state cannot lift off from the end face part-region 43'. In the special case the spring arms 48 are formed integrally on the piston 14 and extend with parallel spacing from the end face part-region 43', the upper boundary surfaces thereof being aligned with the end face 43.

The throttle disc 46 which is retained between the end face part-region 43' and non-rotatably on the end of the adjustment shaft 38 within the housing in lower boundary surfaces of the spring arms 48 is provided on its underside resting on the planar end face part-section 43' with four radially extending recesses 66a, 66b, 66c and 66d which are offset with respect to one another in the circumferential direction in each case by 90°, open into the circumferential surface of the throttle disc and have different widths and depths, i.e. different passage cross-sections.

The bearing lug 47 which projects centrally integrally from the upper face of the throttle disc 46 has—as can be seen in particularly in FIGS. 11 and 14—a trefoil-like cross-section which deviates from the circular shape with convex rounded projections 47a, 47b, 47c and 47d which succeed one another in the circumferential direction and between which respective concave rounded recesses are formed. In the contact region on the bearing lug the spring arms 48 are provided with projections constructed complementary to the recesses formed between the projections 47a to 47d, so that therefore—depending upon the rotated position of the throttle disc 46—a respective projection of complementary shape projecting into the spring arm contact regions of the spring arms 48 engages resiliently in a respective pair of recessed lying between the projections 47a, 47c or 47b, 47d. The alignment of the projections 47a to 47d with the recesses 66a to 66d in the underside of the throttle disc 46 is such that in each of the four possible rotated positions of the throttle disc 46 a respective one of the recesses 66a to 66d is aligned with the passage bore 45 in the piston 14. Thus then, because of the different passage cross-sections of the recesses 66a to 66d a different throttle effect is built up in the working medium flowing from the working chamber 26 via the recesses 66a to 66d and the passage bore 45 into the working chamber 24—and in the reverse direction.

It can be seen that in the described embodiment the throttle characteristic of the damping device is adjustable in each case in four stages in which the throttle disc 46 is rotated accordingly by way of the adjustment shaft 38.

In this case it is clear that the stages can be varied by changes to the number and position of the recesses 66a, b, . . . in the underside of the throttle disc 46 and corresponding changes to the number of projections 47a, 47c, . . . . Furthermore, it can be seen that the design of the retaining device for fixing of the throttle disc 46 in selected throttle stages can also be realised in a different way. Thus for example latching projections or latching recesses which are complementary to one another and offset with respect to one another in the circumferential direction can be provided in the face of the throttle disc facing the spring arm and in the boundary surfaces of the spring arms facing the throttle disc, wherein the number and arrangement of the latching projections or latching recesses with respect to the recesses in the underside of the throttle disc 46 are in turn chosen so that when at least one latching projection is in latching engagement in the associated latching recess a respective one of the recesses formed in the underside of the throttle disc is aligned with the passage bore in the piston which connects the working chambers.

The invention claimed is:

1. A damping device comprising:
a housing having an end wall and an opposite end face;
a piston longitudinally displaceable in the housing
a first working chamber formed on a first side of the piston and a second working chamber formed on an opposite second side of the piston as a function of the displaced position of the piston;
a fluid damping medium passing between the two working chambers via at least one overflow connection;
a piston rod projecting in a sealed manner out of the end wall of the housing is connected on the first side of the piston, the piston rod being received within a passage opening;
an elongated adjustment shaft, with a diameter corresponding substantially to a diameter of the piston rod, is connected only on the second side of the piston and passes through the second working chamber, and a free end of the adjustment shaft projecting in a sealed manner out of the opposite end face of the housing, wherein the adjustment shaft is disposed rotatably within a bearing bore defined in the piston offset laterally relative to the piston rod, the piston having further a passage bore longitudinally defined therein forming an overflow fluid damping medium connection between the working chambers; and
a throttle disc projecting radially from a circumferential surface of the adjustment shaft, the throttle disc abuts the piston at an entrance to the passage bore, and the throttle disc has defined in an end face a plurality of recesses with different passage cross-sections, the plural recesses are circumferentially offset from one another and selectively alignable by rotation of the adjustment shaft within the passage bore,
wherein the throttle disc has a substantially circular perimeter, each of the plural recesses are defined by two parallel surfaces extending radially inward from the perimeter of the throttle disc, the throttle disc is rotatably disposed on or in the piston and secured against longitudinal displacement in a direction of a longitudinal central axis of the adjustment shaft, and retaining devices secure the throttle disc against inadvertent rotation in the respective rotational alignment positions of the recesses with the passage bore in the piston.

2. The damping device according to claim 1, wherein the throttle disc has a bearing lug projecting from a side remote from the second working chamber of the piston through which the adjustment shaft passes, wherein the retaining devices are two spring arms, provided on the piston and resiliently pressed against a circumference of the bearing lug, rotatably retaining the bearing lug therebetween.

3. The damping device according to claim 2, wherein the bearing lug has a non-circular cross-section and is provided with rounded projections and recesses, which alternate in succession in the circumferential direction, and that the spring arms are each provided with contact regions complementary in shape to the circumferential surface of the bearing lug.

4. The damping device according to claim 3, wherein the throttle disc and the bearing lug are integral components.

5. The damping device according to claim 4, wherein an end of the adjustment shaft on the piston rod side is non-rotatably connected to the throttle disc.

6. The damping device according to claim 2, wherein the bearing lug is formed by the end of the adjustment shaft on the piston rod side which passes non-rotatably through the throttle disc.

7. The damping device according to claim 6, wherein each of the throttle disc and the spring arms have complementary alternating latching projections and latching recesses, the latching projections and recesses of the spring arms being offset in the circumferential direction relative to the latching projections and recesses of the throttle disc, the number and arrangement of the latching projections and the latching recesses of the spring arms in relation to those of the throttle disc being selected such that, when at least one of the latching projections engages in the associated latching recess in each case, at least one of the latching recesses formed in the end face of the throttle disc facing the end face of the piston is aligned with the passage bore in the piston which connects the working chambers.

8. The damping device according to claim 1, wherein a contact region of the throttle disc, on an intermediate planar portion of the piston remote from the adjustment shaft, is disposed inward in a longitudinal direction, in a stepped manner, relative to an end face of the piston on the piston rod side in the direction of the second working chamber through which the adjustment shaft passes, by such an amount that the boundary surfaces of the spring arms remote from the throttle disc which are pressed resiliently on the bearing lug do not project over the end face of the piston on the piston rod side.

9. The damping device according to claim 8, wherein the spring arms are attached to the piston with a spacing corresponding substantially to the thickness of the throttle disc, parallel to the contact region of the throttle disc on the intermediate planar portion.

10. The damping device according to claim 9, wherein the spring arms are an integral part of the piston.

11. The damping device according to claim 1, wherein a handle is provided on the free end of the adjustment shaft.

12. The damping device according to claim 11, wherein the handle is constructed as a rotary knob which is enlarged in diameter, the circumferential surface of the rotary knob being provided with grooves or a knurling.

13. The damping device according to claim 11, wherein the housing and the piston, disposed so as to be longitudinally displaceable in the interior of the housing, have a cross-section that is oval or formed by two parallel straight boundaries closed at their ends by arcs.

14. The damping device according to claim 11, wherein the piston rod is offset in terms of its longitudinal central axis laterally with respect to a longitudinal central axis of the adjustment shaft and retained in the passage opening in the piston, and in a region of the passage opening in the piston through which the piston rod passes an overflow passage is constructed via a recessed groove, and that in the first working chamber of the piston rod on the piston rod end a valve collar is displaceably retained between a position in which it rests on the piston end face and closes the overflow passage and a position in which it is raised from the piston end face and connects the overflow passage to the second working chamber remote from the piston rod.

15. The damping device according to claim 14, wherein the passage opening in the piston has a circular cross-section which corresponds substantially to the diameter of the piston rod and at least one portion of the cross-section of the passage opening has an enlarged diameter which forms the recessed groove defining the overflow passage in the passage opening.

16. The damping device according to claim 14, wherein the valve collar is an integral part of the piston rod.

17. The damping device according to claim 11, wherein the plural recesses with different passage cross-sections are formed in an end face of the throttle disc facing the intermediate planar portion and open radially outward along a circumferential surface of the throttle disc.

18. A damping device comprising:
- a housing having an end wall and an opposite end face;
- a piston longitudinally displaceable in the housing;
- a first working chamber formed on on a first side of the piston and a second working chamber formed on an opposite second side of the piston as a function of the displaced position of the piston;
- a fluid damping medium passing between the two working chambers via at least one overflow connection;
- a piston rod projecting in a sealed manner out of the end wall of the housing is connected on the first side of the piston, the piston rod being received within a passage opening;
- an elongated adjustment shaft, with a diameter corresponding substantially to a diameter of the piston rod, passes through the second working chamber, and a free end of the adjustment shaft projecting in a sealed manner out of the opposite end face of the housing, wherein the adjustment shaft has a length defined between the free end and an engaged end located opposite to the free end of the adjustment shaft, wherein the engaged end of the adjustment shaft is located between the first side and second side of the piston, wherein the adjustment shaft is disposed rotatably within a bearing bore defined in the piston, the piston having a passage bore longitudinally defined therein forming an overflow fluid damping medium connection between the working chambers; and
- a throttle disc projecting radially from a circumferential surface of the adjustment shaft, the throttle disc abuts the piston at an entrance to the passage bore, and the throttle disc has defined in an end face a plurality of recesses with different passage cross-sections, the plural recesses are circumferentially offset from one another and selectively alignable by rotation of the adjustment shaft within the passage bore, wherein the throttle disc has a substantially circular perimeter; each of the plural recesses are defined by two parallel surfaces extending radially inward from the perimeter of the throttle disc, the throttle disc is rotatably disposed on or in the piston and secured against longitudinal displacement in a direction of a longitudinal central axis of the adjustment shaft, and retaining devices secure the throttle disc against inadvertent rotation in the respective rotational alignment positions of the recesses with the passage bore in the piston.

* * * * *